(12) United States Patent
Dan et al.

(10) Patent No.: US 8,635,585 B2
(45) Date of Patent: *Jan. 21, 2014

(54) CAPTURING INFORMATION ACCESSED, UPDATED AND CREATED BY PROCESSES AND USING THE SAME FOR VALIDATION OF CONSISTENCY

(75) Inventors: Asit Dan, Pleasantville, NY (US); Claus T. Jensen, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

This patent is subject to a terminal disclaimer.

(21) Appl. No.: 12/371,584

(22) Filed: Feb. 14, 2009

(65) Prior Publication Data

US 2010/0211926 A1   Aug. 19, 2010

(51) Int. Cl.
*G06F 9/44* (2006.01)

(52) U.S. Cl.
USPC .............................. 717/104; 717/105; 717/107

(58) Field of Classification Search
None
See application file for complete search history.

(56) References Cited

U.S. PATENT DOCUMENTS

| | | | |
|---|---|---|---|
| 6,028,997 A * | 2/2000 | Leymann et al. | 717/104 |
| 6,308,224 B1 * | 10/2001 | Leymann et al. | 719/310 |
| 6,360,223 B1 | 3/2002 | Ng et al. | 1/1 |
| 6,393,386 B1 | 5/2002 | Zager et al. | 703/25 |
| 6,742,175 B1 * | 5/2004 | Brassard | 717/107 |
| 6,907,395 B1 * | 6/2005 | Hunt et al. | 703/21 |
| 7,031,901 B2 | 4/2006 | Abu El Ata | 703/21 |
| 7,181,694 B2 | 2/2007 | Reiss et al. | 715/747 |
| 7,219,327 B1 * | 5/2007 | Jacobs et al. | 717/104 |
| 7,313,782 B2 * | 12/2007 | Lurie et al. | 717/104 |
| 7,331,035 B2 * | 2/2008 | Loos et al. | 717/104 |
| 7,448,024 B2 * | 11/2008 | Breeden et al. | 717/125 |
| 7,458,062 B2 | 11/2008 | Coulthard et al. | 717/121 |
| 7,506,302 B2 | 3/2009 | Bahrami | 717/100 |
| 7,568,019 B1 | 7/2009 | Bhargava et al. | 709/223 |
| 7,631,291 B2 * | 12/2009 | Shukla et al. | 717/107 |
| 7,703,071 B2 | 4/2010 | Kuester et al. | 717/104 |
| 7,895,568 B1 | 2/2011 | Goodwin et al. | 717/108 |
| 7,917,889 B2 * | 3/2011 | Devarakonda et al. | 717/104 |
| 8,069,439 B2 * | 11/2011 | Shukla et al. | 717/125 |
| 2003/0009433 A1 | 1/2003 | Murren et al. | 707/1 |
| 2003/0033182 A1 | 2/2003 | Stok et al. | 705/7 |
| 2004/0031015 A1 * | 2/2004 | Ben-Romdhane et al. | 717/107 |

(Continued)

OTHER PUBLICATIONS

Christopher J. Pavlovski and Joe Zou, Non-Functional Requirements in Business Process Modeling, Copyright @ 2008, Australian Computer Society, Inc., vol. 79, Editors, pp. 1-10.*

(Continued)

*Primary Examiner* — Thuy Dao
*Assistant Examiner* — Mongbao Nguyen
(74) *Attorney, Agent, or Firm* — Steven Chiu

(57) ABSTRACT

Techniques for extending a process model with specification of information consumed. A receiving operation receives specification of process information consumed by a process implementation of the process model. Another receiving operation receives specification of activity process information consumed by activities employed by the process implementation of the process model. The information consumed is information that is or needs to be used without being passed through exposed interfaces. A generating operation automatically generates an extended process model using a computer processor. The extended process model includes specification of exposed interfaces, the process information consumed by the process implementation, and the activity information consumed by the activity implementation. Further embodiments includes techniques for identifying information inconsistencies in the extended process model if the information consumed not available as called for by the extended process model.

25 Claims, 5 Drawing Sheets

(56) References Cited

U.S. PATENT DOCUMENTS

| | | | |
|---|---|---|---|
| 2004/0031019 A1* | 2/2004 | Lamanna et al. | 717/125 |
| 2004/0078777 A1 | 4/2004 | Bahrami | 717/105 |
| 2004/0153992 A1* | 8/2004 | Molina-Moreno et al. | 717/105 |
| 2005/0289510 A1* | 12/2005 | Illowsky et al. | 717/107 |
| 2006/0143591 A1* | 6/2006 | Hilerio et al. | 717/101 |
| 2006/0206863 A1* | 9/2006 | Shenfield et al. | 717/107 |
| 2006/0206864 A1* | 9/2006 | Shenfield et al. | 717/107 |
| 2007/0006122 A1* | 1/2007 | Bailey et al. | 717/101 |
| 2007/0006134 A1 | 1/2007 | Larvet et al. | 717/104 |
| 2007/0016886 A1* | 1/2007 | O'Neill | 717/101 |
| 2007/0033571 A1* | 2/2007 | Moore et al. | 717/104 |
| 2007/0038492 A1* | 2/2007 | Ryan et al. | 705/8 |
| 2007/0044067 A1* | 2/2007 | Feldman | 717/104 |
| 2007/0180425 A1* | 8/2007 | Storms et al. | 717/104 |
| 2007/0245297 A1* | 10/2007 | Kuester et al. | 717/104 |
| 2007/0255720 A1* | 11/2007 | Baikov | 707/10 |
| 2008/0059945 A1* | 3/2008 | Sauer et al. | 717/105 |
| 2008/0127047 A1 | 5/2008 | Zhang et al. | 717/104 |
| 2008/0127049 A1 | 5/2008 | Elaasar | 717/104 |
| 2008/0134135 A1 | 6/2008 | Elaasar | 717/104 |
| 2009/0007056 A1 | 1/2009 | Prigge et al. | 717/104 |
| 2009/0113378 A1 | 4/2009 | Boyer et al. | 717/101 |
| 2009/0113394 A1 | 4/2009 | Weber et al. | 717/126 |
| 2009/0171720 A1 | 7/2009 | Crook et al. | 705/7 |
| 2009/0172691 A1* | 7/2009 | Barros et al. | 718/104 |
| 2009/0183138 A1* | 7/2009 | Loos et al. | 717/105 |
| 2009/0198639 A1 | 8/2009 | Narayanaswamy et al. | 706/48 |
| 2009/0327993 A1* | 12/2009 | Chinta et al. | 717/104 |
| 2010/0037201 A1 | 2/2010 | Salle et al. | 717/104 |

OTHER PUBLICATIONS

Peter Burns, Validation of Consumer Credit Risk Models, 2004, pp. 7-11.*

Alexander F. Egyed, Automatically Validating Model Consistency during Refinement, Computer Science Department University of Southern California, 2001, pp. 2-8.*

Richard G. Hills, Statistical Validation of Engineering and Scientific Models: Background, Departments of Mechanical Engineering New Mexico State University, 1999, pp. 41-56.*

Gregor Engels, Process Modeling Using UML, Process-Aware Informaion Systems, 2005, pp. 85-87 and 94-113.*

Dorina kabakchieva, Design and Development of an Extended Enterprise Model, Facta Universtiatis, 2007, pp. 61-67.*

Marco Brambilla, Automatic Generation of Workflow-Extended Domain Models, 2007, pp. 376-386.*

International Search Report for PCT/EP2009/066927, pp. 1-12 (Apr. 8, 2010).

Anonymous: "Computer-aided software engineering" Wikipedia, The Free Encyclopedia, [Online] Nov. 14, 2008, XP002570153 Retrieved from the Internet: URL:http://en.wikipedia.org/w/index.php?title=Computer-aided_software_engineering&oldid=251783793> [retrieved on Feb. 24, 2010].

Anonymous: "Data modeling" Wikipedia, The Free Encyclopedia, [Online] Dec. 8, 2008, pp. 1-8, XP002570146 Retrieved from the Internet: URL:http://en.wikipedia.org/w/index.php?title=Data_modeling&oldid=256726581> [retrieved on Feb. 24, 2010].

* cited by examiner

CAPTURING INFORMATION ACCESSED, UPDATED AND CREATED BY PROCESSES AND USING THE SAME FOR VALIDATION OF CONSISTENCY

CROSS REFERENCE TO RELATED APPLICATIONS

This application is related to U.S. patent application Ser. No. 12/332,606 filed Dec. 11, 2008, titled "CAPTURING INFORMATION ACCESSED, UPDATED AND CREATED BY SERVICES AND USING THE SAME FOR VALIDATION OF CONSISTENCY", the entire text of which is specifically incorporated by reference herein.

BACKGROUND OF THE INVENTION

1. Field of the Invention

The present invention relates to modeling and validating information consumed by processes, as well as activities within processes.

2. Description of Background

In the field of computer science, a service is a software system designed to support interoperable machine-to-machine interaction over a network. A service exposes external interfaces doing something meaningful and offers bindings that consumers bind to. A service can be described in terms of its external interactions using, for example, Web Services Description Language (see <en.wikipedia.org/wiki/Web_Services_Description_Language>). Services typically have a collection of ports with appropriate bindings and an optional detailed description of the interfaces in the port type. If available, interface descriptions include input and output descriptions.

A service modeling language, such as the Unified Modeling Language (see <www.ibm.com/developerworks/rational/library/05/419_soa/>), models the basic service description. The description includes port type, interfaces and bindings, and optionally other services invoked by internal processing of the service. Modeling the internal invocation of other services is done for wiring or orchestration purposes only, without providing any way of analyzing service realization and information consumption aspects.

A process is a flow of activities (see <en.wikipedia.org/wiki/Process>). A process modeling language, such as Business Process Modeling Language (BPML) or Business Process Modeling Notation (BPMN) (see <en.wikipedia.org/wiki/Business_Process_Modeling_Language>), models the basic activity flow of a process as well as the input and output interface of that process.

A process execution modeling language, such as BPEL (see <en.wikipedia.org/wiki/BPEL>), in the context of SOA (Service-Oriented Architecture), models a process as an orchestration of activities embodied by humans and services. The process invokes abstracted activities during its execution (often referred to as processes executing over services). Modeling the invocation of activities and services is done for wiring or orchestration purposes only, without providing any way of analyzing information consumption aspects.

An information model (see <en.wikipedia.org/wiki/Information_model>) is an abstract, formal representation of information entities that includes their properties, relationships and the operations that can be performed on them. An information model is classically used in a data or information architecture context. An information model may be additionally used as a shared semantic context for definition of interfaces.

Current service, activity and process modeling languages include the inputs and outputs of services and processes, however they do not take into account the additional information consumed internally by the services, activities and processes. This lack of information representation can lead to information mismatch upon downstream assembly when, for some reason, appropriate information is not available. Current modeling mechanisms are unable to detect these issues, as they do not include the necessary model elements to perform information verification. The information mismatch issues may occur in both transactional and bulk processing contexts.

As described, information consumed by services, activities and processes is not part of current modeling approaches. Hence, currently there are no quantitative and qualitative control mechanisms for availability of information. Based on standard models there is no way to verify the balanced "equation" between services, processes and information needed to support business solutions. However, in order to avoid expensive rework, it is critical to detect an information mismatch problem before initiating assembly of the solution. The earlier such problems are identified, the less expensive they are to correct. Furthermore, a programmer should not have to figure out information consumption and information quality characteristics. Such characteristics are the concern of information architecture.

SUMMARY OF THE INVENTION

One aspect of the invention is a method for extending a process model. The process model includes specification of an exposed interface. A receiving step in the method receives specification of process information consumed by a process implementation of the process model. The process information consumed is information that is or needs to be utilized by the process implementation without being passed through the exposed process interface.

The method further includes receiving specification of activity information consumed by at least one activity implementation employed by the process implementation. The activity implementation is modeled by an activity model. The activity information consumed is information that is or needs to be utilized by the activity implementation of the activity model without being passed through an exposed activity interface.

The method includes automatically generating an extended process model using a computer processor. The extended process model includes specification of the exposed process interface, specification of the process information consumed by the process implementation, specification of the exposed activity interface, and specification of the activity information consumed by the activity implementation.

Another aspect of the invention is a computer implemented method for extending an activity model. The activity model includes specification of an exposed activity interface. The method includes receiving specification of activity information consumed by an activity implementation of the activity model. The activity information consumed is information that is or needs to be utilized by the activity implementation of the activity model without being passed through an exposed activity interface.

The method includes automatically generating an extended activity model using a computer processor. The extended activity model includes specification of the exposed activity interface and specification of the activity information consumed by the activity implementation.

In one embodiment of the invention, the specifications of the information consumed by the process and activity implementation of the process and activity models include a consumption type of the information consumed. The consumption type specifies one or more function types performed on the consumed information. For example, consumption type may specify at least one of a creating the information consumed operation, a reading the information consumed operation, an updating the information consumed operation, and a deleting the information consumed operation performed by the service implementation.

A further embodiment of the invention includes non-functional annotation of the information consumed. For example, the non-functional annotation may include a quality criterion for the information consumed. The non-functional annotation may additionally or alternatively include a timing criterion for the information consumed specifying when the information consumed is required by the process or activity implementation. In one embodiment of the invention, the activity timing criterion is automatically derived from a process flow of the process model.

In another embodiment of the invention, the specification of the information consumed by the process and activity implementation of the process and activity models includes identification of at least one information source supplying the information consumed by the implementations. Tools may be used to receive the various information consumed requirements of the process and activity models and to automatically identify and allocate an information source meeting such requirements.

The method may also include an identifying step that identifies at least one information inconsistency in the extended process model if the information consumed by the process and/or activity model implementation does not match at least one available information source for internal processing by the program components. Furthermore, activities can create, read, update and delete information consumed by other activities. Hence, temporal inconsistencies may exist if information generated or modified by one activity is unavailable when required by another activity. Tools may be used to flag such information inconsistency and automatically correct the same by rearranging activity temporal order and/or by allocating a new information source satisfying the model requirements.

Another aspect of the invention is a computer program product embodied in a computer usable medium. For example, the computer program product may include one or more tools for modeling and validating information consumed by processes and activities. Computer readable program codes are coupled to the computer usable medium and are configured to cause the program to receive specification of information consumed by process and activity implementations of the process model.

Process information consumed is information that is or needs to be utilized by the process implementation without being passed through the exposed process interface. Activity information consumed is information that is or needs to be utilized by the activity implementation of the activity model without being passed through an exposed activity interface.

Computer readable program codes are further configured to automatically generate an extended process model using a computer processor. The extended process model includes specification of the exposed process interface, specification of the process information consumed by the process implementation, specification of the exposed activity interface, and specification of the activity information consumed by the activity implementation.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-4.

Figure 1:
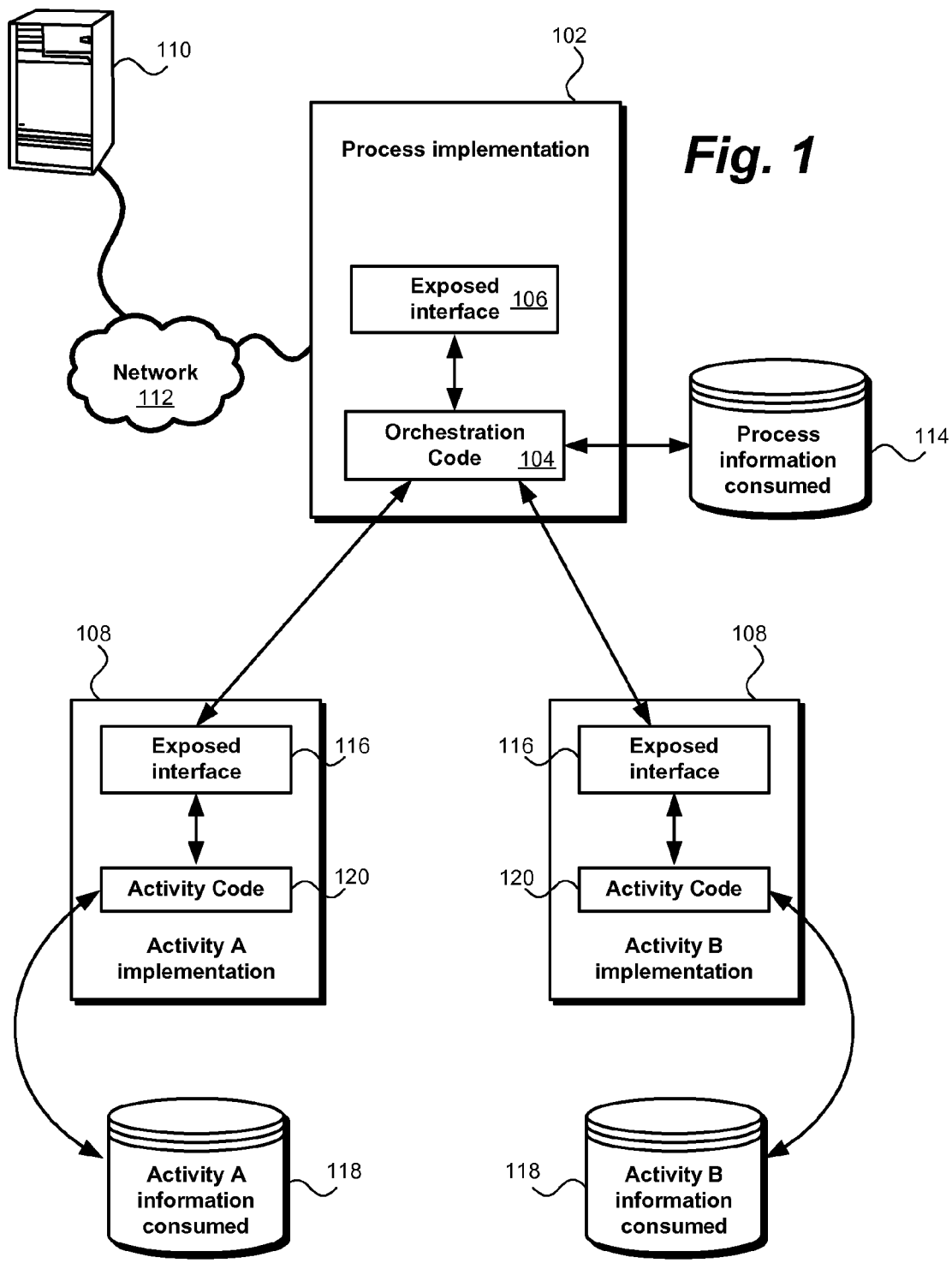
FIG. 1 shows an example of a process implementation modeled by the present invention.

Turning to FIG. 1, an example process implementation 102 modeled by an embodiment of the present invention is shown. As used herein, a process is a description of a flow of activities. Each activity is a set of contiguous and autonomous business or technical operations. The process implementation 102 includes orchestration code 104 for implementing the process' operation. The orchestration code 104 may be written in various programming or modeling languages known in the art. Such programming languages may include object oriented programming languages such as C++, Java or the like. The programming languages may also include conventional procedural programming languages, such as C, FORTRAN or the like. The modeling languages may also include process modeling languages like Business Process Modeling Notation (BPMN), Business Process Execution Language (BPEL) and other languages used to describe the implementation aspects of the process.

The process implementation 102 also includes an exposed process interface 106. An exposed process interface is a published interface defining at least the input parameters passed to the process and the output parameters from the process.

For example, the exposed process interface 106 may communicate with various activity implementations 108 associated with the process implementation 102, as well as a process user 110 (human or machine). Thus, using the exposed process interface 106, a process user 110 (human or machine) can pass input parameters and an operation call to the process implementation via a computer network 112. Activities 108 associated with the process implementation 102 can be invoked via the orchestration code 104.

The process, in performing its operation, can access additional information not passed through the exposed process interface 106. In other words, the process information consumed 114 is the net result of all the activity information consumed (defined below). This information is referred to herein as process information consumed 114. For example, a vacation reservation process may access records in a user account database directly without communicating through the exposed process interface 106.

As mentioned, one or more activities are employed by the process implementation 102. Each activity implementation 108 includes an exposed activity interface 116. Like the exposed process interface 106, the exposed activity interface 116 is a published interface defining the input parameters passed to the activity and the output parameters from the activity. Thus, the exposed activity interface 116 can be used to communicate commands and data between an activity implementation 108 and a process implementation 102.

In addition, an activity implementation 108 can access information not passed through the exposed activity interface 116. This information referred to herein as activity information consumed 118. Thus, activity program code 120 in the activity implementation 108 may access activity information consumed without use of the exposed activity interface 116.

For example, the vacation reservation process may utilize two activities: a flight reservation activity (Activity A) and a hotel reservation activity (Activity B). The flight reservation activity may receive from its exposed activity interface parameters for flight origin, destination, and date. The activity consumes additional information stored in an airline's database, such as flight times and seat availability without passing through the exposed activity interface.

Once the flight reservation activity is completed, the activity outputs parameters through the exposed interface to the orchestration code 104. The orchestration code 104 passes flight reservation data to the second activity, the hotel reservation activity. In this process there is temporal dependency between activities; the hotel reservation activity is performed only after the flight reservation activity books an airline flight. Again, the hotel reservation activity may access activity information consumed, such as a hotel database, without use of the exposed activity interface 116.

It is noted that the preceding discussion about the process implementation of FIG. 1 is greatly simplified for illustration purposes. Many process implementations are difficult to design and often require process and activity modeling tools to facilitate their creation and modification. An embodiment of the present invention extends traditional process and activity models to include specification of information utilized by the process implementation 102 and activity implementation 108 without being passed through their respective exposed interfaces 106 and 116. The embodiment captures necessary information consumed 114 and 118 to architect and design a process with one or more activities.

Modeling information requirement validation in accordance with the present invention is performed early to avoid rework and wasted effort. The invention can facilitate verification that process models and activity models are consistent from an information perspective, and that correct information is consumed and produced from a business perspective. The invention embodiment addresses necessary modeling and verification mechanisms to perform these actions, and can be used for early identification and correction of information mismatch issues. Information mismatch issues are also referred to herein as "information inconsistency."

In a particular embodiment of the invention, information inconsistency for processes and activities may occur through mismatch on available information sources for internal processing by the process. Specifically, the information inconsistency may include such scenarios as no appropriate information source exists, the information source specified is incomplete compared to the information requirements, the quality of source information specified in the information requirements is unavailable, the information source is not available at the appropriate time specified by the information requirements, and the process and/or activity model specifies multiple inconsistent information sources.

Furthermore, information inconsistency includes inconsistency in the temporal order of the process flow. Such situations generally involve a first activity or sub-process making an information source available to a second activity or sub-process. When the first activity/sub-process does not satisfy the informational dependency of the second activity/sub-process, information inconsistency occurs. Analysis of activity hierarchy within the process flow helps identify such temporal information inconsistency.

In accordance with an embodiment of the invention, the information consumed is integrated with process models and activity models. In a particular embodiment, a Process Information Consumption model component is added to conventional process models. In a further embodiment of the invention, an Activity Information Consumption model component is added to conventional activity models.

The Information Consumption models are used to verify information inconsistencies across the breadth of a business solution. To achieve precision and formal representation for the Information Consumption models, the models are based on the notion of information entities (based on an information model for a defined scope or portfolio of assets).

Figure 2:
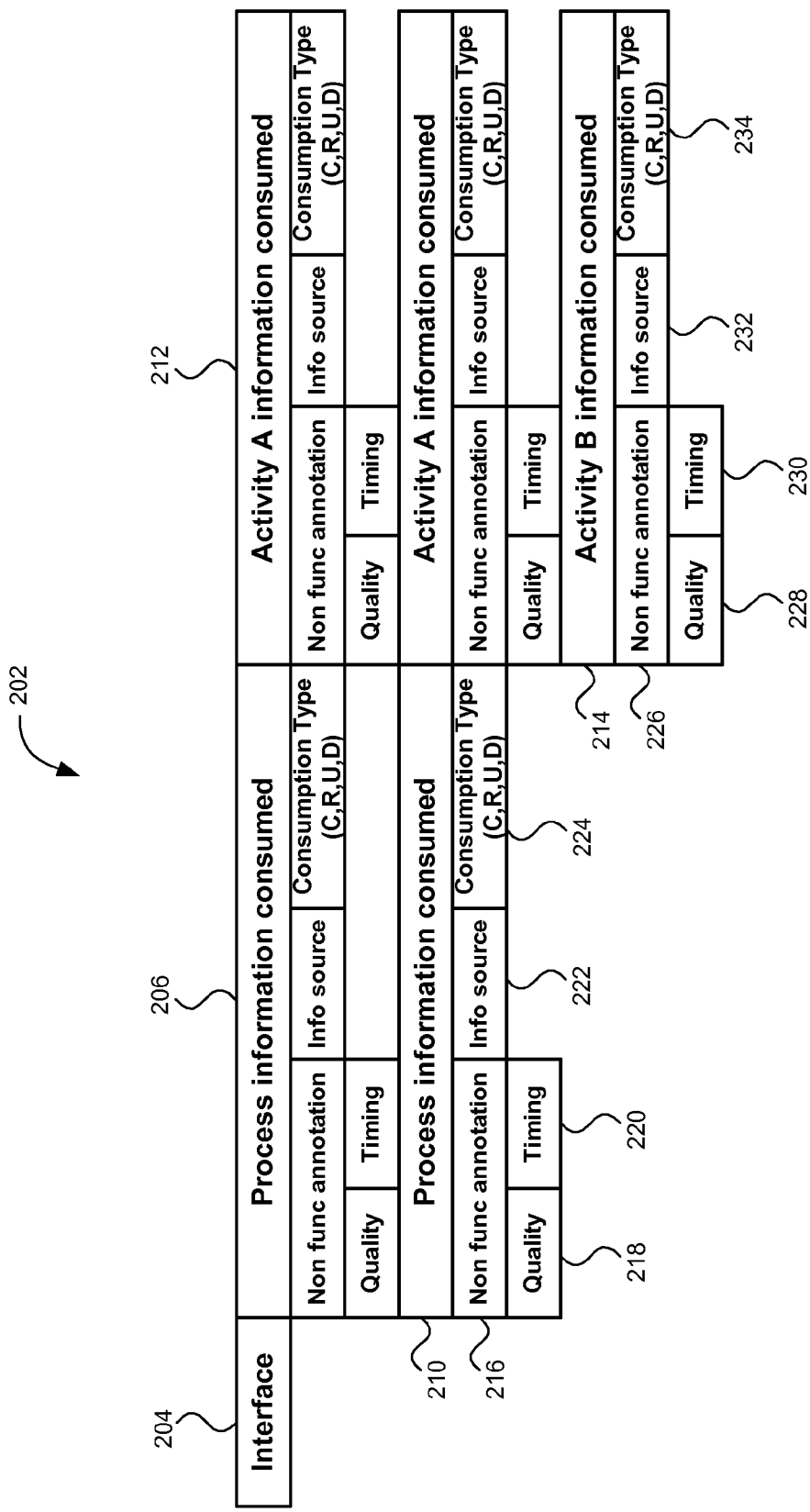
FIG. 2 illustrates one embodiment of a process model extended to provide a process information consumption model contemplated by the present invention.

Turning now to FIG. 2, one embodiment of a process model 202 extended to provide a Process Information Consumption model and contemplated by the present invention is shown. The process model 202 includes a specification of an interface 204 available to a process user, a list 206 specifying process information consumed 210 by the process, and a list 212 specifying activity information consumed 214 by each activity employed by the process.

For example, the extended process model 202 shown in FIG. 2 indicates that Activity A consumes two information sources, while Activity B consumes one information source. In addition, the two entries for process information consumed indicate the entire modeled process consumes information from two information sources.

The process information consumed list 206 is an aggregation of all the activity information consumed by actives utilized by the modeled process. Thus, the net result information consumed by the process activities is expressed in the process information consumed list 206. Moreover, a designer may use a fixed information consumed list 206 as a design constraint of the activity implementation.

As used herein, "information consumed" is defined as information that is accessed, updated, deleted and/or created by a process or activity without being passed through an exposed interface of the process or activity. The process information consumed field 210 captures persistent and staged information accessed, updated or created by the process. Likewise, the activity information consumed field 214 captures persistent and staged information accessed, updated or created by the activity.

The specification of process information consumed 210 and activity information consumed 214 also captures information required from a business or execution perspective but not yet assigned to an information source. As discussed further below, by including a specification of process information consumed 210 and activity information consumed 214 in the process model 202, the present invention can be beneficially used to detect information inconsistencies between a process, the activities of the process, and information sources used therewith early in the design process.

Information Consumption models are expressed using information entities in a similar fashion to their use in traditional Information models. Preferably, but not exclusively, the information entities are semantically based on a shared global information model for the solution in question. If the specification of process information consumed 210 and activity information consumed 214 is based on a global information model, then the operations part of that information model can be used for additional validation of information sources, as discussed below.

In one embodiment of the invention, the Process Information Consumption model 202 provides, in addition to the information discussed above, nonfunctional annotations 216 for each process information consumed 210. The nonfunctional annotations 216 may include, for example, a description of how particular process information consumed is utilized by the process.

It is contemplated that the nonfunctional annotations 216 may consist of a specification of the quality 218 of the process information consumed and the timing 220 that the process information consumed should be available to the process. For example, a vacation reservation process may specify a degree of trustworthiness or a degree of staleness that an information source must satisfy in the quality field 218. Similarly, the process model may specify when data from the information source must be made available to the implementation in the timing field 220.

The process model 202 may optionally specify the information sources allocated for each process information consumed 222 record. As discussed in more detail below, this field's value may be automatically generated by a software tool based on other requirements in the process model.

The process model 202 may additionally include a consumption type field 224. The consumption type 224 specifies one or more function types performed on the consumed information. For example, consumption type may specify at least one of a creating the information consumed operation, a reading the information consumed operation, an updating the information consumed operation, and a deleting the information consumed operation performed by the process implementation. It is noted that combinations of consumption type operations may be specified in the process model 202. For example, information may be read, updated and deleted, but not created, by the process implementation for a particular information source.

In another embodiment of the invention, the Process Information Consumption model 202 provides, in addition to the information discussed above, nonfunctional annotations 226 for each activity information consumed 214. The nonfunctional activity annotations 226 may describe, for instance, how particular activity consumed information is utilized by the activity.

Again, it is contemplated that the nonfunctional annotations 226 may consist of a specification of the quality 228 of the activity information consumed and the timing 230 that the activity information consumed should be available to the activity. The process model 202 may also specify the information sources allocated for activity information consumed 232 records. As detailed below, this field's value may be automatically generated by a software tool based on activity requirements.

The process model 202 may additionally include a consumption type field 234 for each activity information consumed 214. The consumption type 234 specifies one or more function types performed on the consumed information. For example, consumption type 234 may specify at least one of a creating the information consumed operation, a reading the information consumed operation, an updating the information consumed operation, and a deleting the information consumed operation performed by the process implementation.

It is contemplated that the information quality, timing, source, and consumption type specifications for either the process information consumed or activity information consumed can be used to further enhance the information consistency analysis.

The information consistency analysis checks the process model 202 against available information sources. Specifically, the information consistency analysis validates that assigned and available information sources can provide full support for the information consumed. In other words, information consistency analysis confirms that all information entities are available at one information source or another. For example, the analysis can confirm that the available information sources include information updated or read by the modeled activities.

The information consistency analysis may further validate that available information sources have appropriate quality and timing characteristics. As mentioned above, it may be the case that the activity information consumed must be of a particular quality or be available at a particular time of execution. The consistency analysis can be used to verify such scenarios and reveal architectural flaws that fail to satisfy the information quality and/or information timing design requirements. With respect to timing design requirements, such analysis can examine process flow and reveal any information dependency issues between activities and sub-processes.

The information consistency analysis can also validate that information entity operations (based on an Information model) match information consumed characteristics. For instance, the analysis can verify whether the specified consumption type (create, read, update, and/or delete operations) is permitted by an allocated information source. Finally, the analysis can update and enrich metadata with information sources based on the specified process/activity information consumed. This action can include assigning information sources to process information consumed 210 and activity information consumed 214 as they are discovered and applied.

Another embodiment of the invention includes extended software tools that support Process Information Consumption models. For example, the software tools can include capabilities to annotate process models with Process Information Consumption models. The tools may provide an editor, such as a text editor or a graphical editor, allowing a designer to incorporate the Process Information Consumption models with conventional process models. A text editor can, for instance, allow the user to markup text fields specifying the information consumed, information quality and information timing requirements of a process/activity design. A graphical editor may, for example, allow users to drag-and-drop various process/activity templates containing specifications for information consumed onto a graphical workspace.

It is further contemplated that the software tools may be capable of validating the information consistency of processes and activities. As mentioned above, the software tools may, for example, extend process modeling methods by analyzing and validating persistent and/or staged information accessed, updated and created by a process or activity. Thus, in addition to tracking endpoints consumed under classical process and service modeling, the software tools can analyze the information sources consumed (accessed, updated or created) by the process and activity. Furthermore, when information quality and timing characteristics are specified in the model, the analysis can verify that applicable information entities matching such information specification are available to the process and activity.

As mentioned, the software tools may analyze information required to execute the process and its associated activities, including information not yet assigned to information sources and non-functional characteristics. The analysis can further determine if required information entities to be consumed can be found from available information sources (see FIG. 2 items 222 and 232), and if so, can be automatically allocated to the information entities as an information source.

The tools may also, automatically or manually, allocate information sources to processes and activities based on information characteristic rules. For example, if an activity model requires a particular information quality of the information consumed, the software tool can select from among a plurality of available information sources an entity capable of satisfying the required information quality, if one exists. The software tools can also be used to fulfill information timing requirements in a similar fashion.

It is additionally contemplated that the software tools can validate process models against information inconsistencies. The validation can, for example, check whether a required information source does not exist, an information source provides incomplete information, information is unavailable at the appropriate time from the information source (including temporal mismatch in the process flow), and if multiple inconsistent information sources exist.

Another embodiment of the invention includes extending an activity model using computer executable tools. As with the process model, the activity model includes specification of an exposed activity interface.

In extending the activity model, specification of activity information 212 consumed by an activity implementation of the activity model is received. As mentioned above, the activity information consumed is information that is or needs to be utilized by the activity implementation of the activity model without being passed through an exposed activity interface. A computer automatically generates an extended activity model using a computer processor. The extended activity model includes specification of the exposed activity interface and specification of the activity information consumed 212 by the activity implementation.

Figure 3A:
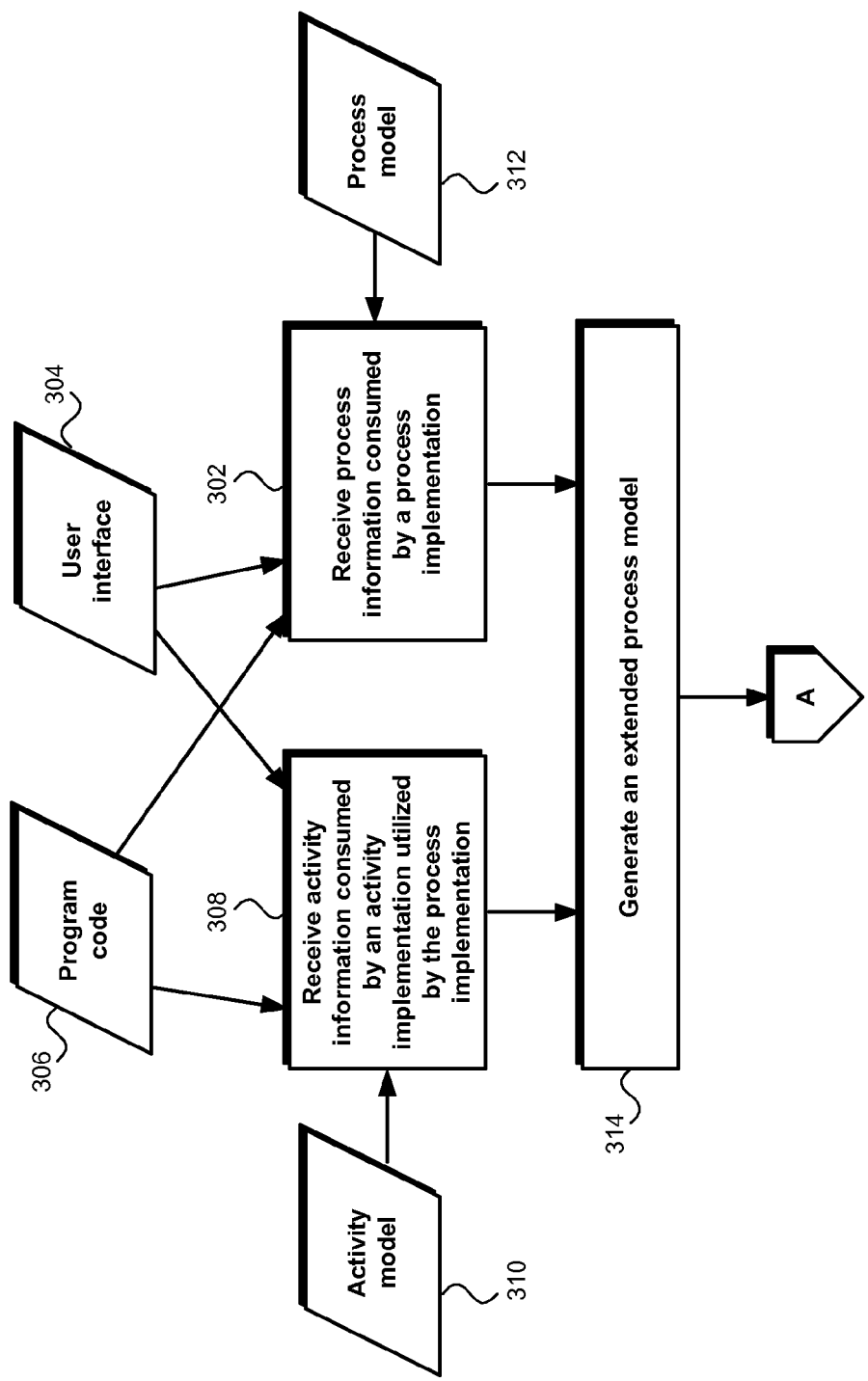
FIG. 3 shows one possible flowchart of computer implemented operations for modeling a process in accordance with the present invention.
Figure 3B:
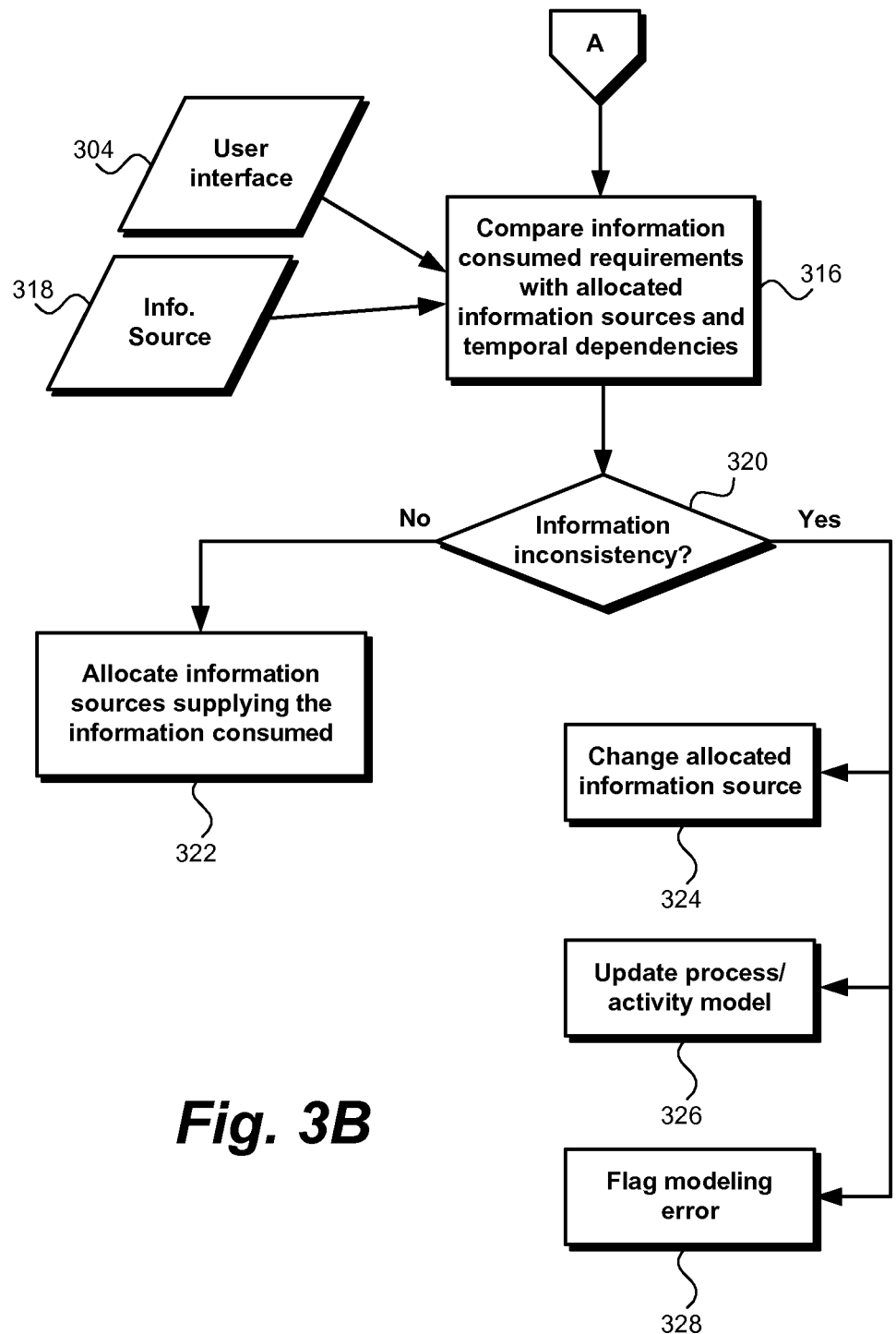

Turning now to FIG. 3A, one possible flowchart is shown illustrating computer implemented operations for extending a process model, as contemplated by the present invention. The process model to be extended includes specification of an exposed process interface.

The operations begin with receiving operation 302. During the receiving operation 302, specification of process information consumed by a process implementation of the process model is received. The process information consumed by the process implementation is information utilized by the process implementation without being passed through the exposed interface.

Specification of process information consumed by the process implementation can include consumption type, non-functional annotation of the process information consumed and specification of information sources. The non-functional annotation may include a quality criterion for the process information consumed by the process implementation. The non-functional annotation may also include a timing criterion for the process information consumed specifying when the information consumed is required by the process implementation. This timing criterion should be consistent with the process orchestration code (see FIG. 1, item 104). In one embodiment of the invention, the process flow is analyzed by the analysis tool to automatically determine activity dependency and the timing criterion based on activity dependency.

It is contemplated that the process information consumed by the process implementation can be received by human input. In a particular embodiment of the invention, a user interface 304 is provided to assist human annotation of information aspects of process models. Such a user interface 304 can be an extension of existing modeling tools.

In a further embodiment of the invention, the process information consumed by the process implementation can be received by tool assisted analysis. In a particular embodiment of the invention, the tool assisted analysis automatically determines the information consumed by the process implementation by examination of the process implementation. Such analysis can include analyzing program code 306 in the process implementation for information transfers outside the exposed interface. For example, the tool may analyze SQL queries against structured data in relational databases. The tool may additionally analyze queries against unstructured data using existing capabilities of incorporating unstructured data in the information fabric.

The operations also include receiving operation 308. This receiving operation 308 accepts specification of activity information consumed by activity implementations employed by the process model. The activity information consumed by the activity implementation is information utilized by the activity implementation without being passed through exposed interfaces.

Specification of activity information consumed by the activity implementation can include consumption type, non-functional annotation of the process information consumed and specification of information sources. The non-functional annotation may include a quality criterion for the process information consumed by the process implementation. The non-functional annotation may also include a timing criterion for the activity information consumed specifying when the information consumed is required by the activity implementation.

As with the process information consumed, the activity information consumed by the activity implementation can be received by human input. In a particular embodiment of the invention, a user interface 304 is provided to assist human annotation of information aspects of activity models. Such a user interface 304 can be an extension of existing modeling tools.

In a further embodiment of the invention, the activity information consumed by the activity implementation can be received by tool assisted analysis. In a particular embodiment of the invention, the tool assisted analysis automatically determines the information consumed by the activity implementation by examination of the activity implementation. Such analysis can include analyzing program code 306 in the activity implementation for information transfers outside the exposed interface.

In another embodiment of the invention, information consumed can be automatically received by analyzing activity models 310 and process models 312. For example, tool assisted analysis can traverse internal activity invocations and either report the information findings or incorporate them in the higher level Information Consumed models of the orchestrating process. Note that traversing activity invocations hierarchically, and synthesizing information consumed through those bindings, is only possible if the invoked activity is in fact correctly annotated with input and output information entities. Syntactical input and output parameters are not enough; the information entities going in to and out of the invocation must be deducible, hence there is a recursive property applied in a hierarchical structure of processes and sub-processes interacting with activities.

At generating operation 314, an extended process model is automatically generated for the process using a computer processor. The extended process model includes specification of the exposed process interface, specification of the process information consumed by the process implementation, specification of the exposed activity interface, and specification of the activity information consumed by the activity implementation. As discussed above, the model may also include non-functional annotation about the information consumed, such as timing and quality criteria. The model may further specify a specific information source to be used and a consumption type for the information consumed. After completion of generating operation 314, control passes to comparing operation 316 (shown in FIG. 3B).

At comparing operation 316, the extended process model is compared against allocated and available information sources to identify any information inconsistencies. Information inconsistency occurs when information consumed by the process and activity implementations do not match at least one allocated or available information source for consumed information.

It is contemplated that information source capabilities may be received via human input through the user interface 304, or from analysis of allocated and available information sources 318 known to the modeling tool. This step may also capture any non-functional aspects of the information sources, such as the quality criterion and timing criterion of the information. Again, the non-functional information may be obtained through the user interface 304 or from analysis of allocated information sources 318.

After completion of comparing operation 316, control passes to identifying operation 320. The identifying operation 320 determines if any information inconsistency exists between the extended process model and allocated and available information sources. As discussed above, information inconsistency may occur through such scenarios as no source information specified in the model exists, the source specified in the model is not available, the quality of information specified in the model is completely unavailable or is unavailable when called for by a timing criterion, temporal information inconsistency of activity/sub-process hierarchy within the process flow, and the model specifies multiple inconsistent information sources.

In one configuration of the invention, information mismatch problems are detected early. For example, identification of at least one information inconsistency in the process model is performed before substantial source code for the process implementation is written. The earlier information mismatch problems are identified, the less expensive they are to correct. Furthermore, a programmer should not have to figure out information consumption and information quality characteristics. Such characteristics are the concern of information architecture. If no information inconsistency is identified, control passes to allocating operation 322.

At allocating operation 322, at least one information source for internal processing by the process/activity implementation is automatically or manually allocated based, at least in part, on the information consumed by the process/activity implementation. Of course not all information entities represent persistent information, but for those that do there is value to assign as metadata the actual information source that is to be accessed for each persistent information entity.

On the other hand, if identifying operation 320 finds the existence of one or more information inconsistencies between the extended process model and allocated and available information sources, several possible operations may be taken to correct the inconsistency. For example, control may pass to allocating operation 324, where a different information source is allocated to the process or activity meeting the extended process model requirements. Allocating operation 324 can be performed manually through the user interface or automatically by the modeling tool.

Alternatively, the extended process model may be updated at updating operation 326 to meet the limitations of the allocated information sources. This operation can include adding or changing activities employed by the process, or change the flow structure of the process using the same or different activities. Process updating may be performed manually through the user interface. Once the extended process model is updated, the modeling tool can once again return to comparing operation 316 iteratively search for further information inconsistencies. Finally, the modeling tool may simply alert the user that process modeling error has been found at flagging operation 328. The user would have the option to correct the information inconsistency or not.

Another aspect of the invention is directed to embodiments that can be embodied in the form of computer-implemented processes and apparatuses for practicing those processes, which is now described with reference to FIG. 4. For example, the computer implemented operations for modeling a computer program are embodied in computer program code executed by computer processors.

Figure 4:
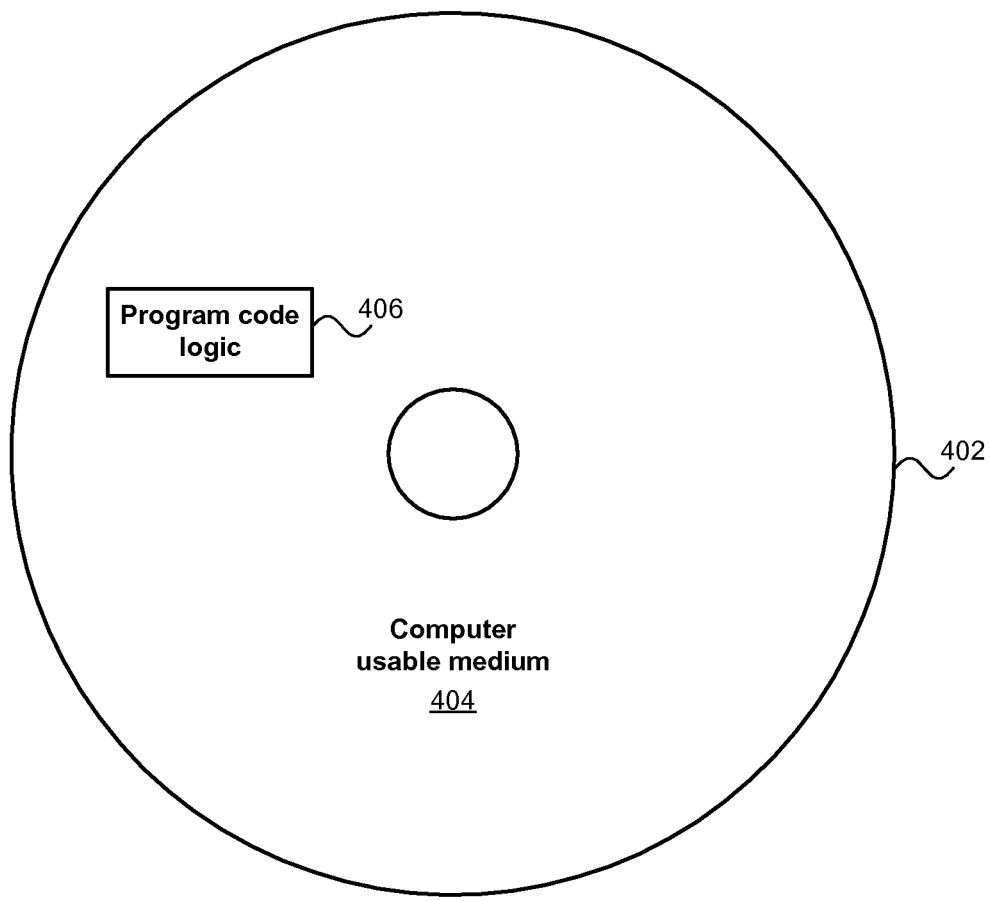
FIG. 4 depicts one embodiment of an article of manufacture incorporating one or more aspects of the invention.

Embodiments include a computer program product 402 as depicted in FIG. 4 on a computer usable medium 404 with computer program code logic 406 containing instructions embodied in tangible media as an article of manufacture. Exemplary articles of manufacture for computer usable medium 404 may include floppy diskettes, CD-ROMs, hard drives, universal serial bus (USB) flash drives, or any other computer-readable storage medium, wherein, when the computer program code logic 406 is loaded into and executed by a computer, the computer becomes an apparatus for practicing the invention.

Embodiments include computer program code logic 406, for example, whether stored in a storage medium, loaded into and/or executed by a computer, wherein, when the computer program code logic 406 is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system can be provided. The article of manufacture can be included as a part of a computer system or sold separately.

The capabilities of the operations for modeling a computer program can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for extending a process model, the process model including specification of an exposed process interface, the method comprising the steps of:
   receiving specification of process information consumed by a process implementation of the process model, the process information consumed being information that is or needs to be utilized by the process implementation without being passed through the exposed process interface;
   receiving specification of activity information consumed by at least one activity implementation employed by the process implementation, the activity implementation modeled by an activity model, the activity information consumed being information that is or needs to be utilized by the activity implementation of the activity model without being passed through an exposed activity interface; and
   automatically generating an extended process model using a computer processor, the extended process model including specification of the exposed process interface, specification of the process information consumed by the process implementation, specification of the exposed activity interface, and specification of the process information consumed by the process implementation.

2. The computer implemented method of claim 1, further comprising:
   the extended process model further includes specification of the activity information consumed by the activity implementation.

3. The computer implemented method of claim 2, further comprising identifying at least one information inconsistency in the process model if the activity information consumed by the activity model does not match the process information consumed by the extended process model.

4. The computer implemented method of claim 1, wherein receiving specification of the process information consumed by the process implementation includes providing a user interface to input the process information consumed by the process implementation by a modeler.

5. The computer implemented method of claim 1, wherein the specification of the process information consumed by the process implementation of the process model includes identification of at least one information source supplying the process information consumed.

6. The computer implemented method of claim 1, further comprising identifying at least one information inconsistency in the process model if the process information consumed by the process model does not match at least one available information source for processing by the process implementation.

7. The computer implemented method of claim 6, wherein identifying at least one information inconsistency in the process model is performed before substantial source code for the process implementation is written.

8. The computer implemented method of claim 1, further comprising automatically allocating an information source for processing by the process implementation of the process model based, at least in part, on the process information consumed by the process implementation.

9. The computer implemented method of claim 1, wherein the specification of the process information consumed by the process implementation of the process model includes non-functional process annotation.

10. The computer implemented method of claim 9, wherein the non-functional process annotation includes a quality criterion for the process information consumed.

11. The computer implemented method of claim 9, wherein the non-functional process annotation includes a process timing criterion for the process information consumed specifying when the process information consumed is required by the process implementation.

12. The computer implemented method of claim 11, further comprising identifying at least one information inconsistency in the process model if the process information consumed by the process model is not available before the process timing criterion.

13. The computer implemented method of claim 1, wherein the specification of the process information consumed by the process implementation of the process model includes a consumption type, the consumption type specifying at least one of a creating the process information consumed operation, a reading the process information consumed operation, an updating the process information consumed operation, and a deleting the process information consumed operation performed by the process implementation.

14. A computer implemented method for extending an activity model, the activity model including specification of an exposed activity interface, the method comprising the steps of:
   receiving specification of activity information consumed by an activity implementation of the activity model, the activity information consumed being information that is or needs to be utilized by the activity implementation of the activity model without being passed through an exposed activity interface;
   receiving specification of activity information consumed by at least one activity implementation employed by the process implementation, the activity implementation modeled by an activity model, the activity information consumed being information that is or needs to be utilized by the activity implementation of the activity model without being passed through an exposed activity interface; and
   automatically generating an extended activity model using a computer processor, the extended activity model including specification of the exposed activity interface, specification of the process information consumed by the process implementation, specification of the exposed activity interface, and specification of the activity information consumed by the activity implementation.

15. The computer implemented method of claim 14, wherein receiving specification of activity information consumed by the activity implementation includes:
   receiving the activity implementation of the activity model; and
   automatically determining the activity information consumed by the activity implementation by examination of the activity implementation.

16. The computer implemented method of claim 15, wherein automatically determining the activity information consumed by the activity implementation includes analyzing code in the activity implementation for information transfers outside the exposed activity interface.

17. The computer implemented method of claim 14, wherein receiving specification of the activity information consumed by the activity implementation includes providing a user interface to input the information consumed by the activity implementation by a modeler.

18. The computer implemented method of claim 14, wherein the specification of the activity information consumed by the activity implementation of the activity model includes identification of at least one information source supplying the activity information consumed.

19. The computer implemented method of claim 14, wherein the specification of the activity information consumed by the activity implementation includes non-functional annotation.

20. The computer implemented method of claim 19, wherein the non-functional annotation includes a quality criterion for the activity information consumed.

21. The computer implemented method of claim 19, further comprising:
wherein the non-functional annotation includes an activity timing criterion for the activity information consumed specifying when the activity information consumed is required by the activity implementation; and
identifying at least one information inconsistency in the activity model if the activity information consumed by the activity model is not available before the activity timing criterion, the activity timing criterion being automatically derived from a process flow of a process model implementation employing the activity implementation.

22. The computer implemented method of claim 14, further comprising identifying at least one information inconsistency in the activity model if the activity information consumed by the activity model does not match at least one available information source for processing by the activity implementation.

23. The computer implemented method of claim 14, further comprising automatically allocating an information source for processing by the activity implementation of the activity model based, at least in part, on the activity information consumed by the activity implementation.

24. The computer implemented method of claim 14, wherein the specification of the activity information consumed by the activity implementation of the activity model includes a consumption type, the consumption type specifying at least one of a creating the activity information consumed operation, a reading the activity information consumed operation, an updating the activity information consumed operation, and a deleting the activity information consumed operation performed by the activity implementation.

25. A computer program product embodied in a non-transitory computer usable memory comprising:
computer readable program codes coupled to the computer usable medium for extending a process model, the process model including specification of an exposed process interface, the computer readable program codes configured to cause the program to:
receive specification of process information consumed by a process implementation of the process model, the process information consumed being information that is or needs to be utilized by the process implementation without being passed through the exposed process interface;
receive specification of activity information consumed by at least one activity implementation employed by the process implementation, the activity implementation modeled by an activity model, the activity information consumed being information that is or needs to be utilized by the activity implementation of the activity model without being passed through an exposed activity interface; and
automatically generate an extended process model using a computer processor, the extended process model including specification of the exposed process interface, specification of the process information consumed by the process implementation, specification of the exposed activity interface, and specification of the activity information consumed by the activity implementation.

* * * * *